(12) United States Patent
Cichos et al.

(10) Patent No.: US 10,442,988 B2
(45) Date of Patent: Oct. 15, 2019

(54) METHOD FOR PREPARING WATER-DISPERSIBLE QUANTUM DOTS, COLLOID AND A METHOD FOR PREPARING THE COLLOID

(71) Applicant: UNIWERSYTET WROCLAWSKI, Wroclaw (PL)

(72) Inventors: Jakub Cichos, Olawa (PL); Miroslaw Karbowiak, Wroclaw (PL)

(73) Assignee: UNIWERSYTET WROCLAWSKI, Wroclaw (PL)

( * ) Notice: Subject to any disclaimer, the term of this patent is extended or adjusted under 35 U.S.C. 154(b) by 981 days.

(21) Appl. No.: 14/946,140

(22) Filed: Nov. 19, 2015

(65) Prior Publication Data
US 2017/0044430 A1    Feb. 16, 2017

(30) Foreign Application Priority Data
Aug. 11, 2015    (PL) ..................... PL413504

(51) Int. Cl.
| | |
|---|---|
| *C09K 11/56* | (2006.01) |
| *C09K 11/66* | (2006.01) |
| *C09K 11/02* | (2006.01) |
| *B82Y 40/00* | (2011.01) |
| *B82Y 20/00* | (2011.01) |

(52) U.S. Cl.
CPC .......... *C09K 11/562* (2013.01); *C09K 11/025* (2013.01); *B82Y 20/00* (2013.01); *B82Y 40/00* (2013.01); *Y10S 977/774* (2013.01); *Y10S 977/892* (2013.01); *Y10S 977/95* (2013.01)

(58) Field of Classification Search
CPC ............................ C09K 11/661; C09K 11/562
See application file for complete search history.

(56) References Cited

U.S. PATENT DOCUMENTS

| | | | |
|---|---|---|---|
| 6,251,303 B1 | 6/2001 | Bawendi | |
| 2010/0069901 A1 | 3/2010 | Policewicz et al. | |

FOREIGN PATENT DOCUMENTS

| | | |
|---|---|---|
| CN | 101805606 A1 | 8/2010 |
| WO | 2010 043053 A1 | 4/2010 |
| WO | 2014 089743 A1 | 6/2014 |

OTHER PUBLICATIONS

Dubois. A Versatile Strategy for Quantum Dot Ligand Exchange. p. 482-483. J. Am. Chem. Soc. 2007, 129, 482-483.*
Ho Jin, et al. "Strong Polyelectrolyte Quantum Dot Surface for Stable Bioconjugation and Layer-by-Layer Assembly Applications", Chem. Commun., 2011, 47, 1758-1760.
H. T. Uyeda, et al. "Synthesis of Compact Multidentate Ligands to Prepare Stable Hydrophilic Quantum Dot Flourorphores", J. Am. Chem. Soc., 2007, 129, 13987.
W. Liu, et al "Compact Biocompatible Quantum Dots Functionalized for Cellular Imaging", J. Am. Chem. Soc., 2008,130, 1274.
Hines, M. A.; Scholes, G. D. "Colloidal PbS Nanocrystals with Size-Tunable Near-Infrared Emission: Observation of Post-Synthesis Self-Narrowing of the Particle Size Distribution" Adv. Mater. 2003, 15, 1844-1849.
Pietryga et al. "Utilizing the Lability of lead Selenide to Produce Heterostructured Nanocrystals with Bright, Stable Infrared Emission" J. Am. Chem. Soc. 2008, 130, 4879-4885 9 4879.
K. Susumu, et al. "Enhancing the Stability and Biological Functionalities of Quantum Dots via Compact Multifunctional Ligands", J. Am. Chem. Soc., 2008,130, 1274.

* cited by examiner

*Primary Examiner* — Matthew E. Hoban
(74) *Attorney, Agent, or Firm* — Craft Chu PLLC; Andrew W. Chu (57) ABSTRACT

The method for preparing water-dispersible core-shell quantum dots stabilized with a layer of hydrophilic surface ligands includes making a core of PbS nanocrystals, and obtaining the shell of CdS layer and the surface ligands of dithiocarbamates obtained by reacting amino acids with carbon disulphide, while maintaining the photoluminescence. The emulsion formed of an aqueous solution of amino acid and carbon disulphide includes adding a solution of PbS/CdS in chloroform ($CHCl_3$). Then, the contents are stirred vigorously for at least 20 hours, then the phases are separated. The upper, aqueous phase, being a solution of PbS/CdS/DTC-amino acid residue, is subjected to purification. The present invention is also colloid and a method for preparing colloid.

11 Claims, 6 Drawing Sheets

METHOD FOR PREPARING WATER-DISPERSIBLE QUANTUM DOTS, COLLOID AND A METHOD FOR PREPARING THE COLLOID

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention concerns a method for preparing water-dispersible core-shell quantum dots stabilised with a layer of hydrophilic surface ligands, wherein the core is made up of PbS nanocrystals, the shell of CdS layer and the surface ligands are dithiocarbamates obtained by reacting amino acids with carbon disulphide, while maintaining the photoluminescence, colloid and a method of preparing colloid.

2. Description of Related Art Including Information Disclosed Under 37 CFR 1.97 and 37 CFR 1.98

In recent years, the technique of fluorescence imaging in NIR range has developed into a method which enables in vitro/in vivo imaging of biological structures. Biological tissues are transparent to the greatest extent in the range of 700-900 nm (NIR-I range), however, recently it has been shown that when using quantum dots (QDs) for in vivo imaging a more preferred range, due to reduced scattering of photons, deeper penetration of tissues and a greatly improved signal to noise ratio, is the spectral range of 1,000 to 1,400 nm (NIR-II). PbS quantum dots belong to the group of fluorophores having the most promising properties as emitters in the range of NIR-II.

An important factor limiting the use of quantum dots, including PbS, in the biological sciences is the fact that the most effective methods of synthesis lead to obtaining the QDs with the surface stabilised with hydrophobic ligands. Such QDs are dispersible in non-polar organic solvents such as chloroform or toluene, but not in water. Therefore, for biological applications it is necessary to obtain a hydrophilic surface of the QDs while introducing reactive functional groups that then can be used to engage the QDs with various (bio)molecules to make them bio-functional.

In the current scientific literature there can be found only a few reports on modification of surface of lead chalcogenides, aimed at obtaining lasting solutions of colloidal QDs in polar media. The strategy commonly used to convert the hydrophobic nanoparticles into nanoparticles dispersible in water is replacing the original hydrophobic ligands on the surface of the NCs with hydrophilic ligands, such as 11-mercaptoundecanoid acid or polyethylene glycol (PEG) phosphate. Another strategy involves intercalation of the amphiphilic ligand to, for example, oleic acid present on the surface of the NCs.

Nanocrystal semiconductors (quantum dots) soluble in water, known from the Patent Document U.S. Pat. No. 6,251,303, are obtained by using hydrophilic groups attached to the surface of the quantum dot. Compounds acting as ligands are the so-called bi- and trichelating compounds, i.e. having two or three groups that bind to the surface of the quantum dot. A hydrophilic part of ligands may comprise groups such as carboxylic acids, carboxylates, sulfonates, hydroxides, alkoxides, ammonium salts, phosphates. The core of the nanocrystals can be made up of semiconductor materials such as PbS, ZnS, ZnSe, ZnTe, Cds, CdSe, CdTe, GaN, GaP, GaAs, GaSb, InP, InAs, InSb, AlS, AlP, AlAs, AlSb, PbSe, Ge, Si and mixtures thereof. The shell of the quantum dots can be CdS, ZnS, ZnSe, CdSe, GaN, and magnesium chalcogenides.

The Patent Document WO2014089743 describes the preparation of nanocrystalline quantum dots using cationic or anionic precursor. The method is based on precipitation and isolating precipitated quantum dots. The core can be made up of compounds such as PbS, CdS, CdSe, CdTe, ZnS, ZnSe, ZnTe, CdS, CdSe, CdTe, HgS, HgSe, HgTe, A1N, A1P, AlAs, AlSb, GaN, GaP, GaAs, GaSb, GaSe, InN, InP, InAs, InSb, TlN, TlP, TlAs, TlSb PbSe, PbTe or mixtures thereof. The shell can be made up of compounds such as: $Zn_xCd_{1-x}S$, $Mg_xCd_{1-x}S$, $Ca_xCd_{1-x}S$, $Sr_xCd_{1-x}S$, $Ba_xCd_{1-x}S$, $Hg_xCd_{1-x}S$, $Sc_xCd_{1-x}S$, $Al_xCd_{1-x}S$, $Ga_xCd_{1-x}S$, $In_xCd_{1-x}S$, $Mn_xCd_{1-x}S$, $Fe_xCd_{1-x}S$, $Ni_xCd_{1-x}S$, $Cu_xCd_{1-x}S$, $Mo_xCd_{1-x}S$, $Pd_xCd_{1-x}S$, $Ag_xCd_{1-x}S$, $Pt_xCd_{1-x}S$, $Au_xCd_{1-x}S$, CdS, CdSe, CdTe, ZnS, ZnSe, ZnTe, MgS, MgSe, MgTe, HgS, HgSe, HgTe, PbS, PbSe, PbTe, AlN, A1P, AlAs, AlSb, GaN, GaP, GaAs, GaSb, InN, InP, InAs, InSb, TlN, TlP, TlAs, TlSb or mixtures thereof.

The Patent Document WO2010043053 describes water-soluble photoluminescent quantum dots having surface-available carboxylic groups, amino groups, or both. Quantum dots are coated with hydrophilic ligands having single-domain antibodies. The CdSe/ZnS nanocrystals are also coated with the layers containing hydrophilic ligands such as lysine, arginine, proline, valine, alanine, glycine.

The Patent Document CN101805606 describes a method for preparing monodispersive quantum dots using silver dithiocarbamate as a precursor to obtain them. The final products are $Ag_2S$ quantum dots.

However, these methods do not allow to achieve fully satisfactory stability in biological buffers. What is worse, in all cases a significant decrease in the intensity of photoluminescence was observed.

BRIEF SUMMARY OF THE INVENTION

The aim of the invention is to provide a method for preparing PbS/CdS quantum dots, which, when dispersed in aqueous solutions, form stable colloidal solutions, while preserving their photoluminescence properties. In order to prepare water-dispersible PbS/CdS quantum dots, an exchange of surface ligands is performed, from oleic acid to dithiocarbamates prepared in situ by reacting amino acids with carbon disulphide.

Further increase in the stability of the solutions of colloidal nanoparticles can be achieved by coating nanoparticles with a layer of polyelectrolyte. Particularly suitable are polyelectrolytes having a stable charge, such as quaternary ammonium salts. By increasing the effective surface charge, they limit the possibility of agglomeration in a much wider range of pH and ionic strength than simple acid or base surface ligands (e.g. carboxylic acids, primary amines) [Ho Jin, Jutaek Nam, Joonhyuck Park, Sungho Jung, Kyuhyun Im, Jaehyun Hur, Jong-Jin Park, Jong-Min Kim, Sungjee Kim, Chem. Commun., 2011, 47, 1758-1760]. The nanoparticles may be coated with more than one layer of polyelectrolyte to get a charge with the desired sign. In addition, this approach allows to introduce functional groups, opening the way for further surface modifications, e.g. by adding bio-molecules. The use of the "layer-by-layer" technique leads to obtaining quantum dots, colloidal solutions of which exhibit high stability while maintaining small hydrodynamic sizes, much smaller than in the case of the use of derivatives of polyethylene glycol and dihydrolipoic acid, which stabilise the quantum dots in aqueous solutions but result in a significant increase in the hydrodynamic radius. [H. T. Uyeda, I. L. Medintz, J. K. Jaiswal, S. M. Simon and H. Mattoussi, J. Am. Chem. Soc., 2005, 127, 3870.; K. Susumu, H. T. Uyeda, I. L. Medintz, T. Pons, J. B. Delehanty and H. Mattoussi, J. Am. Chem. Soc., 2007, 129, 13987.; W. Liu, M. Howarth, A. B. Greytak, Y. Zheng, D. G. Nocera, A. Y. Ting and M. G. Bawendi, J. Am. Chem. Soc., 2008, 130, 1274].

The essence of the present invention is a method for preparing water-dispersible core-shell quantum dots stabilised with a layer of hydrophilic surface ligands, wherein the core is made up of PbS nanocrystals, the shell of CdS layer and the surface ligands are dithiocarbamates obtained by reacting amino acids with carbon disulphide, while maintaining the photoluminescence, characterised in that a solution of PbS/CdS in chloroform (CHCl3) is added to the emulsion consisting of an aqueous solution of amino acid and carbon disulphide to form a mixture, and next the mixture or contents are stirred vigorously for at least 20 hours, then the phases are separated from the stirred mixture, wherein one of the phases is an upper, aqueous phase, being a solution of PbS/CdS/DTC-amino acid residue, to be subjected to purification.

Preferably, lysine, valine, proline, glycine, arginine, alanine, beta-alanine can be used for amino acids. Preferably, an emulsion phase of amino acid in carbon disulphide is obtained by mixing stoichiometric amounts of both components, wherein the maximum concentration of amino acid is limited by its solubility in water. Preferably, the reaction of the solution of amino acid and carbon disulphide forms dithiocarbamate forms an emulsion phase from the stirred mixture. Preferably, the method uses a solution of PbS/CdS in chloroform (CHCl3) at a concentration ranging from 0 to 100 mg/cm3. Preferably, the volume ratio of the solution of PbS/CdS in chloroform (CHCl3) to the emulsion consisting of an aqueous solution of amino acid and carbon disulphide falls within the range of from 1:10 to 10:1. Preferably, purification is carried out by centrifugation of the aqueous phase representing a solution of PbS/CdS/DTC-amino acid residue, and next acetone is added to the solution until the first cloudiness appears in a clouded solution, then the clouded solution is centrifuged and the centrifuged precipitate is dissolved in a minimum amount of water and then it is re-precipitated with acetone. Preferably, after centrifugation, the precipitate is washed with acetone and dispersed in distilled water to obtain a colloid solution. Preferably, the particles of PbS/CdS/DTC-amino acid residue sized from 4 to 20 nm are obtained.

Another object of the present invention is a colloid solution of water-dispersible core-shell quantum dots stabilised with a layer of hydrophilic surface ligands, wherein the core is made up of PbS nanocrystals, the shell of CdS layer and the surface ligands are dithiocarbamates, obtained by reacting amino acids with carbon disulphide. The colloid solution can include PbS/CdS/DTC-amino acid residue nanoparticles coated with a layer of polyelectrolyte, preferably a quaternary ammonium salt in water or buffer. Preferably, lysine, valine, proline, glycine, arginine, alanine, beta-alanine can be used for amino acids. Preferably, diallyl-dimethyl-ammonium polyhydroxide can be used for quaternary ammonium salt. Preferably, it comprises particles of PbS/CdS/DTC-amino acid residue sized from 4 to 20 nm. Preferably, the colloid is stable for at least 3 months.

The object of the present invention is also a method for preparing colloidal aqueous solutions of core-shell quantum dots stabilised with a layer of hydrophilic surface ligands, wherein the core is made up of PbS nanocrystals, the shell of CdS layer and the surface ligands are dithiocarbamates, characterised in that to the aqueous solution of the PbS/CdS-DTC-amino acid residue quantum dots there is added an excess of a solution of a quaternary ammonium salt and after 24 hours of stirring at room temperature the solution is centrifuged, washed with a small amount of distilled water, then the centrifuged quantum dots are dispersed in a phosphate buffer at pH 7.4 to obtain a colloidal solution of quantum dots in a PBS buffer. Preferably, lysine, valine, proline, glycine, arginine, alanine, beta-alanine can be used for amino acids to obtain nanoparticles of PbS/CdS-DTC-amino acid residue. Preferably, diallyl-dimethyl-ammonium polyhydroxide can be used for quaternary ammonium salt.

The precursor for preparing water-dispersible PbS/CdS quantum dots can be PbS dots prepared with the use of methods described in the literature that use oleic acid as a surface ligand.

The quantum dots used in the examples shown below were obtained with the use of the modified method described by [Hines, M. A.; Scholes, G. D. Colloidal PbS Nanocrystals with Size-Tunable Near-Infrared Emission: Observation of Post-Synthesis Self-Narrowing of the Particle Size Distribution. Adv. Mater. 2003, 15, 1844-1849.] (Example 1).

In order to passivate the surface of quantum dots, their surface is coated with a layer of CdS. Coating with a layer of CdS is necessary to pass quantum dots to an aqueous solution using dithiocarbamates. Any method described in the literature can be used for this purpose. In the following example, PbS/CdS quantum dots were prepared with the use of the modified method described by Pietryga et al. (J. Am. Chem. Soc. 2008, 130, 4879-4885 9 4879) (Example 2).

In order to prepare water-dispersible PbS/CdS quantum dots, an exchange of surface ligands in oleic acid is performed, from oleic acid to dithiocarbamates that are obtained by reacting amino acids with carbon disulphide.

BRIEF DESCRIPTION OF THE SEVERAL VIEWS OF THE DRAWINGS

The present invention is closer presented in the following embodiments and the drawings.

DETAILED DESCRIPTION OF THE INVENTION

Example 1: Synthesis of the PbS Quantum Dots According to the Known Method Developed by M. A. Hines et al 1.0 mmol (223.2 mg) of lead monoxide (PbO), 2.5 mmol (0.79 $cm^3$) of oleic acid and 12.5 $cm^3$ of octadec-1-ene are placed in a tri-railed round-bottomed flask equipped with a thermometer, a tap enabling connection to a vacuum line and a silicone septa. The flask is heated on a magnetic stirrer under stirring to 250° C. until complete digestion of PbO. After this time, the flask is cooled to the temperature of 120° C., and the mixture is dehydrated and deoxygenated under reduced pressure, while the flask is periodically filled with nitrogen. After 60 min of degassing, a solution of bis(trimethylsilyl)sulphide (0.5 mmol, 105 µl) in 1 $cm^3$ of octadec-1-ene is quickly injected through the septa. After 5 minutes, the flask is removed from above the source of heat and allows for natural cooling.

Quantum dots are purified by washing the reaction mixture with methanol (2×), precipitating the nanoparticles with a mixture of acetone and ethanol (1:1), dispersing in toluene and subsequent precipitating with a mixture of acetone and ethanol (2:1). After centrifugation, the precipitate is dispersed in toluene (8 $cm^3$) to obtain a colloidal solution.

Example 2: Synthesis of PbS/CdS Core-Shell Quantum Dots with the Use of the Method Developed by Pietryga et al 0.457 g of CdO, 3 $cm^3$ of oleic acid and 8 $cm^3$ of diphenyl ether are placed in a Schlenk flask and heated to 250° C. under a nitrogen atmosphere until complete digestion of CdO. After this time, the flask is cooled to 120° C., and the mixture is dehydrated and deoxygenated under reduced pressure, while the flask is periodically filled with nitrogen. This way, a solution of cadmium oleate is obtained.

4 $cm^3$ of a solution of PbS quantum dots in toluene, obtained in the previous step, are placed in tri-railed round-bottomed flask equipped with a thermometer, a capillary enabling a circulation of an inert gas through the solution, and a reflux condenser, and heated to 100° C. while stirring and bubbling nitrogen through it. After one hour, the solution of cadmium oleate is transferred to the flask with PbS and heated at 100° C. for 45 min. After this time, the flask is cooled by immersion in cold water, the solution is washed twice with methanol, and the dots are re-precipitated with a mixture of acetone and ethanol (1:1). The dots are dispersed in chloroform and re-precipitated with a mixture of acetone and ethanol (2:1). The precipitate after centrifugation is dispersed in 10 $cm^3$ of chloroform to obtain a colloidal solution (Solution B).

Example 3: Preparation of PbS/CdS@DTC-Lys with the Use of the Method According to the Present Invention 1 $cm^3$ of a solution of lysine at a concentration of 0.7 M is placed in a vial. Next, 0.7 mmol (34.6 µl) of carbon disulphide is injected into the vial, which is then sonicated (10 min). Then, 1 $cm^3$ of a solution of PbS/CdS (0.1 $cm^3$ of Solution B+0.9 $cm^3$ of $CHCl_3$) is added to the obtained emulsion. After sealing, the vial is placed on a magnetic stirrer and the contents are stirred vigorously for 24 hours.

After this time, stirring is turned off and after separation of phases the upper, aqueous phase, being a solution of PbS/CdS/DTC-Lys, is separated and placed into the centrifuge tube. Next, acetone is added to the solution until the first cloudiness appears, then it is centrifuged and the precipitate is dissolved in a minimum amount of water and then re-precipitated with acetone. After centrifugation, the precipitate is washed once more with acetone and dispersed in 1 $cm^3$ of distilled water to obtain a colloidal solution.

Example 4: Preparation of PbS/CdS@DTC-Arg

1 $cm^3$ of a solution of arginine at a concentration of 0.7 M is placed in a vial. Next, 0.7 mmol (34.6 µl) of carbon disulphide is injected into the vial, which is then sonicated (10 min). Then, 1 $cm^3$ of a solution of PbS/CdS (0.1 $cm^3$ of Solution B+0.9 $cm^3$ of $CHCl_3$) is added to the obtained emulsion. After sealing, the vial is placed on a magnetic stirrer and the contents are stirred vigorously for 24 hours.

After this time, stirring is turned off and after separation of phases the upper, aqueous phase, being a solution of PbS/CdS/DTC-Arg, is separated and placed into the centrifuge tube. Next, acetone is added to the solution until the first cloudiness appears, then it is centrifuged and the precipitate is dissolved in a minimum amount of water and then re-precipitated with acetone. After centrifugation, the precipitate is washed once more with acetone and dispersed in 1 $cm^3$ of distilled water to obtain a colloidal solution.

Example 5: Preparation of PbS/CdS@DTC-Pro

1 $cm^3$ of a solution of proline at a concentration of 0.7 M is placed in a vial. Next, 0.7 mmol (34.6 µl) of carbon disulphide is injected into the vial, which is then sonicated (10 min). Then, 1 $cm^3$ of a solution of PbS/CdS (0.1 $cm^3$ of Solution B+0.9 cm³ of CHCl₃) is added to the obtained emulsion. After sealing, the vial is placed on a magnetic stirrer and the contents are stirred vigorously for 24 hours.

After this time, stirring is turned off and after separation of phases the upper, aqueous phase, being a solution of PbS/CdS/DTC-Pro, is separated and placed into the centrifuge tube. Next, acetone is added to the solution until the first cloudiness appears, then it is centrifuged and the precipitate is dissolved in a minimum amount of water and then re-precipitated with acetone. After centrifugation, the precipitate is washed once more with acetone and dispersed in 1 cm³ of distilled water to obtain a colloidal solution.

Example 6: Preparation of PbS/CdS@DTC-Val 2 cm³ of a saturated solution of valine is placed in a vial. Next, 0.43 mmol (21.2 µl) of carbon disulphide is injected into the vial, which is then sonicated (10 min). Then, 1 cm³ of a solution of PbS/CdS (0.1 cm³ of Solution B+0.9 cm³ of CHCl₃) is added to the obtained emulsion. After sealing, the vial is placed on a magnetic stirrer and the contents are stirred vigorously for 24 hours.

After this time, stirring is turned off and after separation of phases the upper, aqueous phase, being a solution of PbS/CdS/DTC-Val, is separated and placed into the centrifuge tube. Next, acetone is added to the solution until the first cloudiness appears, then it is centrifuged and the precipitate is dissolved in a minimum amount of water and then re-precipitated with acetone. After centrifugation, the precipitate is washed once more with acetone and dispersed in 1 cm³ of distilled water to obtain a colloidal solution.

Example 7: Preparation of PbS/CdS@DTC-Gly 1 cm³ of a solution of glycine at a concentration of 0.7 M is placed in a vial. Next, 0.7 mmol (34.6 µl) of carbon disulphide is injected into the vial, which is then sonicated (10 min). Then, 1 cm³ of a solution of PbS/CdS (0.1 cm³ of Solution B+0.9 cm³ of CHCl₃) is added to the obtained emulsion. After sealing, the vial is placed on a magnetic stirrer and the contents are stirred vigorously for 24 hours.

After this time, stirring is turned off and after separation of phases the upper, aqueous phase, being a solution of PbS/CdS/DTC-Gly, is separated and placed into the centrifuge tube. Next, acetone is added to the solution until the first cloudiness appears, then it is centrifuged and the precipitate is dissolved in a minimum amount of water and then re-precipitated with acetone. After centrifugation, the precipitate is washed once more with acetone and dispersed in 1 cm³ of distilled water to obtain a colloidal solution.

Example 8: Preparation of PbS/CdS@DTC-Ala 1 cm³ of a solution of alanine at a concentration of 0.7 M is placed in a vial. Next, 0.7 mmol (34.6 µl) of carbon disulphide is injected into the vial, which is then sonicated (10 min). Then, 1 cm³ of a solution of PbS/CdS (0.1 cm³ of Solution B+0.9 cm³ of CHCl₃) is added to the obtained emulsion. After sealing, the vial is placed on a magnetic stirrer and the contents are stirred vigorously for 24 hours.

After this time, stirring is turned off and after separation of phases the upper, aqueous phase, being a solution of PbS/CdS/DTC-Ala, is separated and placed into the centrifuge tube. Next, acetone is added to the solution until the first cloudiness appears, then it is centrifuged and the precipitate is dissolved in a minimum amount of water and then re-precipitated with acetone. After centrifugation, the precipitate is washed once more with acetone and dispersed in 1 cm³ of distilled water to obtain a colloidal solution.

Example 9. Preparation of PbS/CdS@DTC-β-Ala 1 cm³ of a solution of beta-alanine at a concentration of 0.7 M is placed in a vial. Next, 0.7 mmol (34.6 µl) of carbon disulphide is injected into the vial, which is then sonicated (10 min). Then, 1 cm³ of a solution of PbS/CdS (0.1 cm³ of Solution B+0.9 cm³ of CHCl₃) is added to the obtained emulsion. After sealing, the vial is placed on a magnetic stirrer and the contents are stirred vigorously for 24 hours.

After this time, stirring is turned off and after separation of phases the upper, aqueous phase, being a solution of PbS/CdS/DTC-β-Ala, is separated and placed into the centrifuge tube. Next, acetone is added to the solution until the first cloudiness appears, then it is centrifuged and the precipitate is dissolved in a minimum amount of water and then re-precipitated with acetone. After centrifugation, the precipitate is washed once more with acetone and dispersed in 1 cm³ of distilled water to obtain a colloidal solution.

Example 10: Preparation of the PbS/CdS Quantum Dots Coated with a Layer of Polyelectrolyte and Stabilised with Lysine Dithiocarbamate Preparation of the Solution of Polyelectrolyte In order to coat the water-dispersible quantum dots with a layer of polyelectrolyte, cationic polyelectrolytes can be used. In the exemplary embodiment, diallyl-dimethyl-ammonium polyhydroxide was used. It was obtained in two steps from the commercially available diallyl-dimethyl-ammonium chloride.

A saturated aqueous solution of $Ag_2SO_4$ is added dropwise to the solution of diallyl-dimethyl-ammonium chloride (20%) until complete precipitation of chlorides. The obtained silver chloride is centrifuged and then a saturated solution of $Ba(OH)_2$ (stoichiometric) is added to the clear solution. The precipitated barium sulphate is centrifuged and the obtained solution of diallyl-dimethyl-ammonium polyhydroxide is concentrated using a rotary evaporator.

Alternatively, diallyl-dimethyl-ammonium polyhydroxide can be obtained by using ion-exchange column chromatography.

Coating Dots with a Layer of Polyelectrolyte

An excess of the solution of diallyl-dimethyl-ammonium polyhydroxide (50 µl) is added to an aqueous solution of the PbS/CdS-DTC-Lys quantum dots and after 24 hours of stirring at room temperature the solution is centrifuged (14,000 rpm for 10 min), washed with a small amount of distilled water (0.2 cm³), and the centrifuged dots are dispersed in a phosphate buffer at pH 7.4, obtaining a colloidal solution of quantum dots in PBS buffer.

Figure 1:
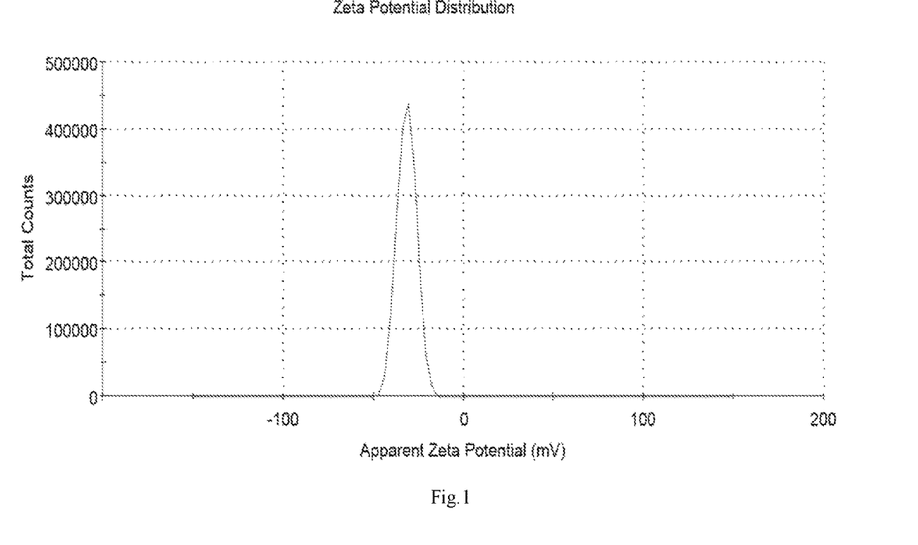
FIG. 1 shows a graph illustration of the zeta potential measured for the sample of PbS/CdS-DTC-Lys in a PbS buffer.

The solution of PbS/CdS/DTC-Lys at pH 7.4 (PBS buffer) exhibits a zeta potential equal to −31.4 mV (FIG. 1). After addition of diallyl-dimethyl-ammonium polyhydroxide and washing the centrifuged dots with a distilled water, the solution exhibits a zeta potential equal to +22.0 mV. At the same time, the size is changed from 8.6 to 20.2 nm, which indicates coating the dots with a chain of polyelectrolyte.

In order to determine which of the amino acids allows to obtain stable colloidal solutions, there has been performed a series of experiments (Examples 3-9), in which only the kind of amino acid varied. The greatest stability characterised colloidal solutions prepared using lysine dithiocarbamate. The use of this ligand allows to obtain a colloidal solution stable for at least 3 months. During that time, no loss of dots from the solution as a precipitate or cloudiness was observed. As for other amino acids, i.e. proline, arginine and valine, they make it possible to obtain aqueous solutions that become, however, opalescent after only 24-72 hours.

Figure 2:
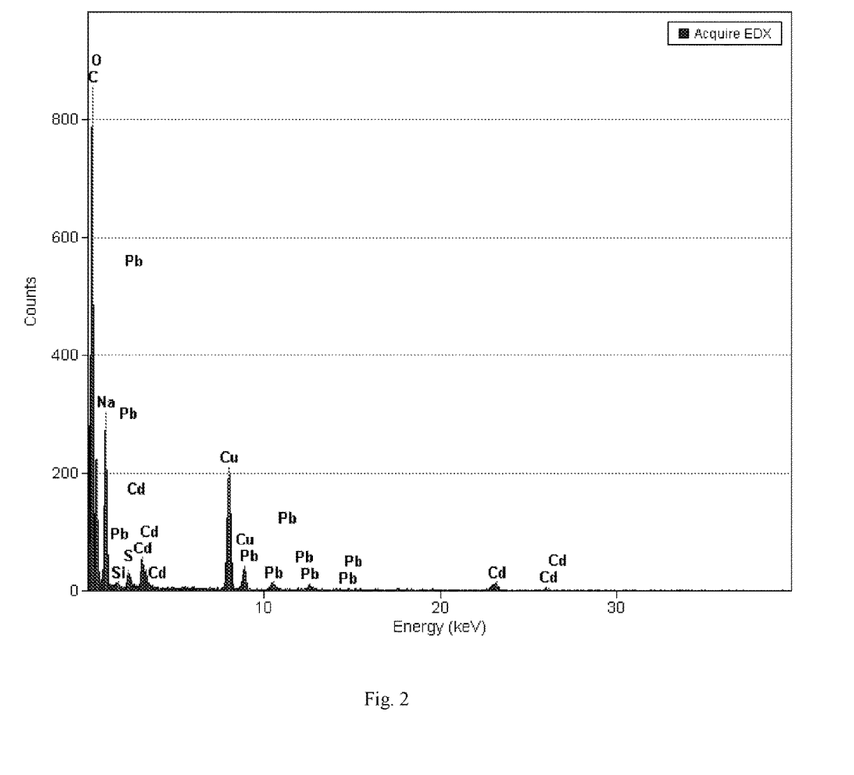
FIG. 2 shows a graph illustration of the EDS spectrum of the PbS/CdS quantum dots.
Figure 3:
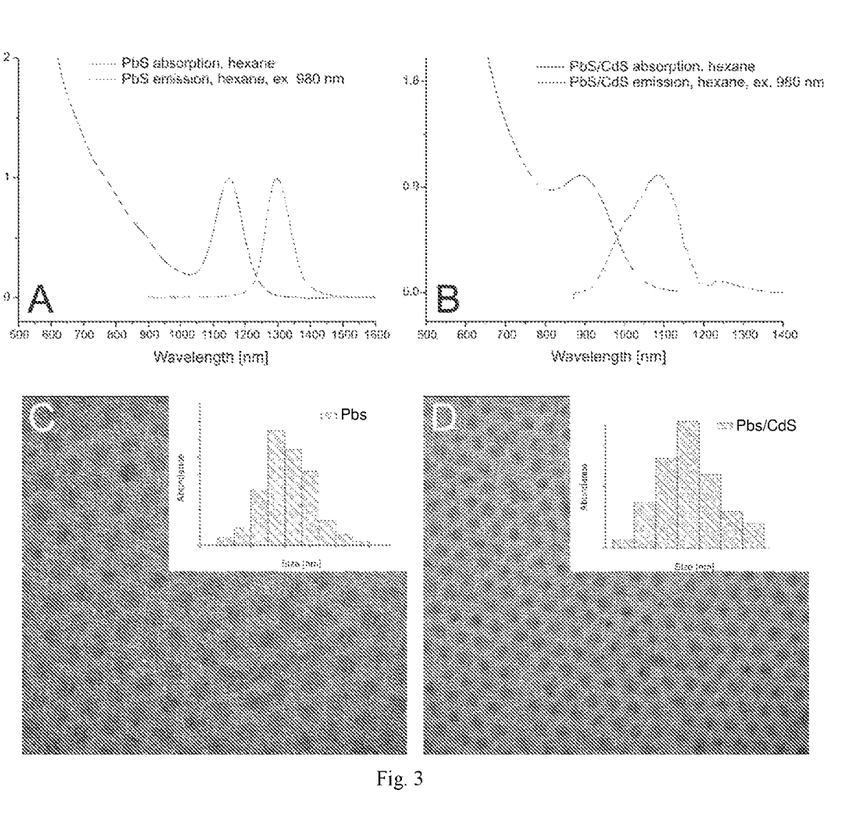
FIG. 3 shows a graph illustration of the emission and absorption spectra of solutions of the PbS quantum dots (A), the PbS/CdS quantum dots (B) and TEM images and size distributions of PbS (C) and PbS/CdS (D).

The EDS (energy dispersion spectroscopy) spectrum recorded using EDAX microprobe installed in a transmission electron microscope (TEM) FEI Tecnai $G^2$ 20 X-TWIN (for the PbS/CdS quantum dots (FIG. 2)) proves the presence of cadmium in the molecules. Moving of the emission and absorption ranges towards shorter wavelengths, visible in FIG. 3, confirms the decrease in the size of PbS particles. FIG. 3 shows the emission and absorption spectra of solutions of the PbS quantum dots (A), the PbS/CdS quantum dots (B) and images taken using a transmission electron microscope (TEM) and size distributions of PbS (C) and PbS/CdS (D).

Figure 4:
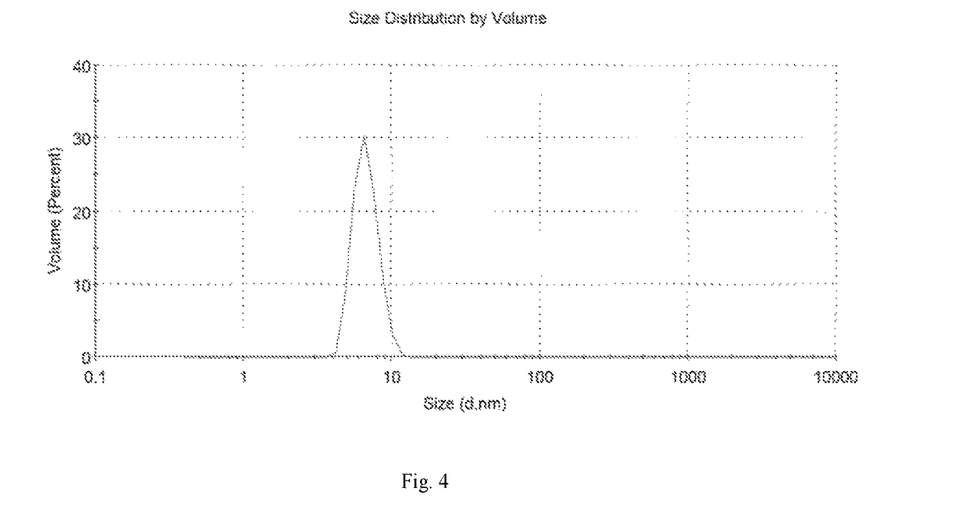
FIG. 4 shows a graph illustration of the size distribution of the PbS quantum dots (solution in hexane) obtained by dynamic light scattering, wherein the average particle size is 6.7 nm.
Figure 5:
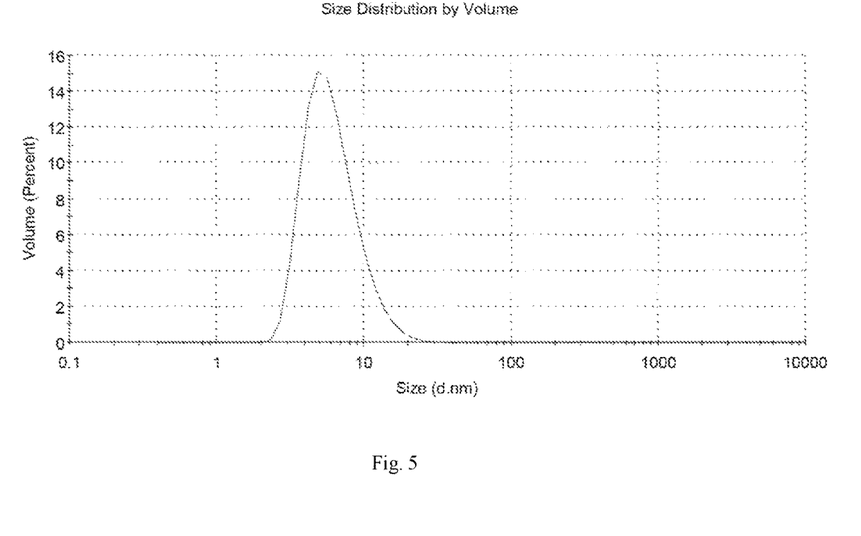
FIG. 5 shows a graph illustration of the size distribution of the PbS/CdS quantum dots (solution in hexane) obtained by dynamic light scattering, wherein the average particle size is 6.8 nm.

These facts combined with practically unchanged size of the nanoparticles (FIG. 4 and FIG. 5) clearly confirm obtaining of a PbS/CdS core-shell structure.

Figure 6:
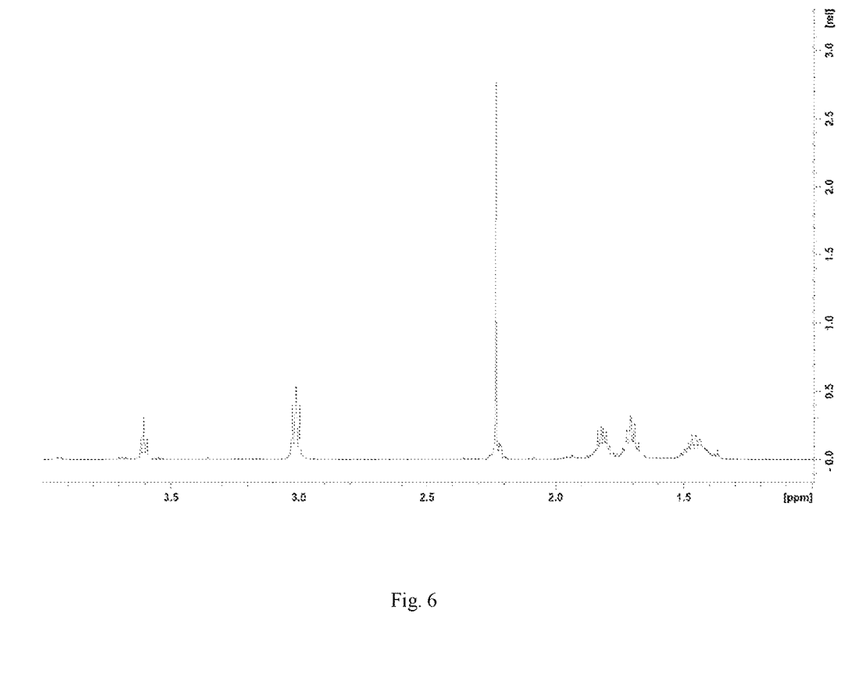
FIG. 6 shows a graph illustration of the 1H NMR spectrum recorded for the sample of PbS/CdS-DTC-Lys.

For PbS/CdS-DTC-Lys, there was carried out a measurement of $^1$H NMR and $^{13}$C NMR. In the $^1$H NMR spectrum (FIG. 6) recorded for the sample of PbS/CdS-DTC-Lys peaks characteristic of molecules of lysine are visible.

Figure 7:
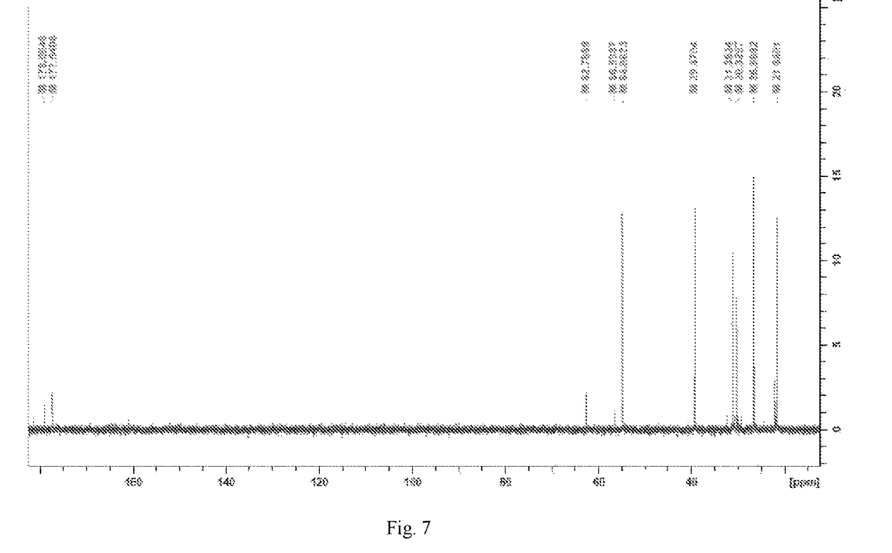
FIG. 7 shows a graph illustration of the 130 NMR spectrum recorded for the sample of PbS/CdS-DTC-Lys.

In the carbon spectrum (FIG. 7), the presence of three signals in the range of 170-190 ppm clearly indicates the presence of—apart from carbon of the carboxyl group—carbons of the dithiocarbamate group. Two additional signals should be matched with carbons of $CS_2^-$ resulting from the reaction of carbon disulphide with one of the two amino groups present in the molecule of lysine. Other signals are characteristic of the molecules of lysine. This confirms the presence of dithiocarbamate ligands on the surface of quantum dots.

Figure 8:
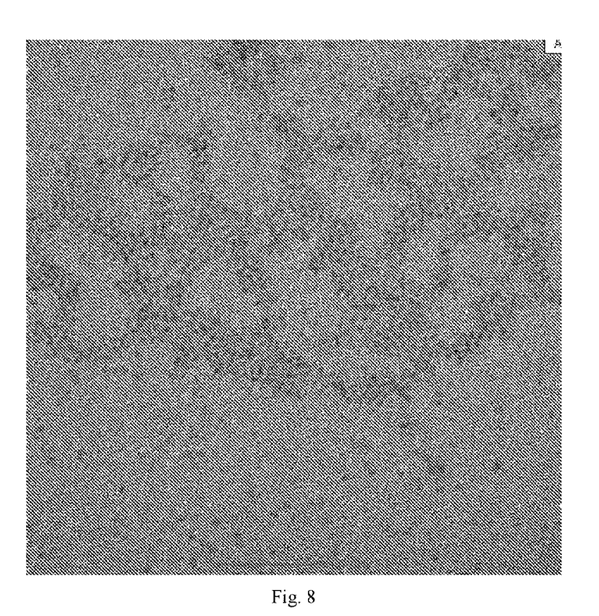
FIG. 8 shows a TEM image of the sample of PbS/CdS/DTC-Lys.
Figure 9:
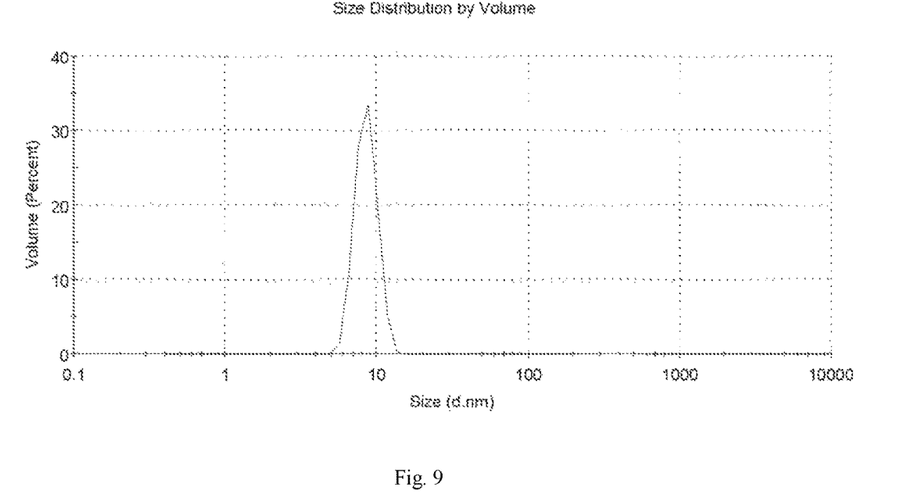
FIG. 9 shows a graph illustration of the size distribution of the PbS/CdS-DTC-Lys (aqueous solution) quantum dots obtained by dynamic light scattering, wherein the average particle size is 8.6 nm.

The image in FIG. 8, showing a TEM image of the PbS/CdS/DTC-Lys quantum dots, indicates no agglomeration of quantum dots in an aqueous solution. This fact is also confirmed by the measurements carried out by means of dynamic light scattering (DLS), resulting in obtaining a single peak derived from objects with an average size of 8.6 nm (FIG. 9).

Figure 10:
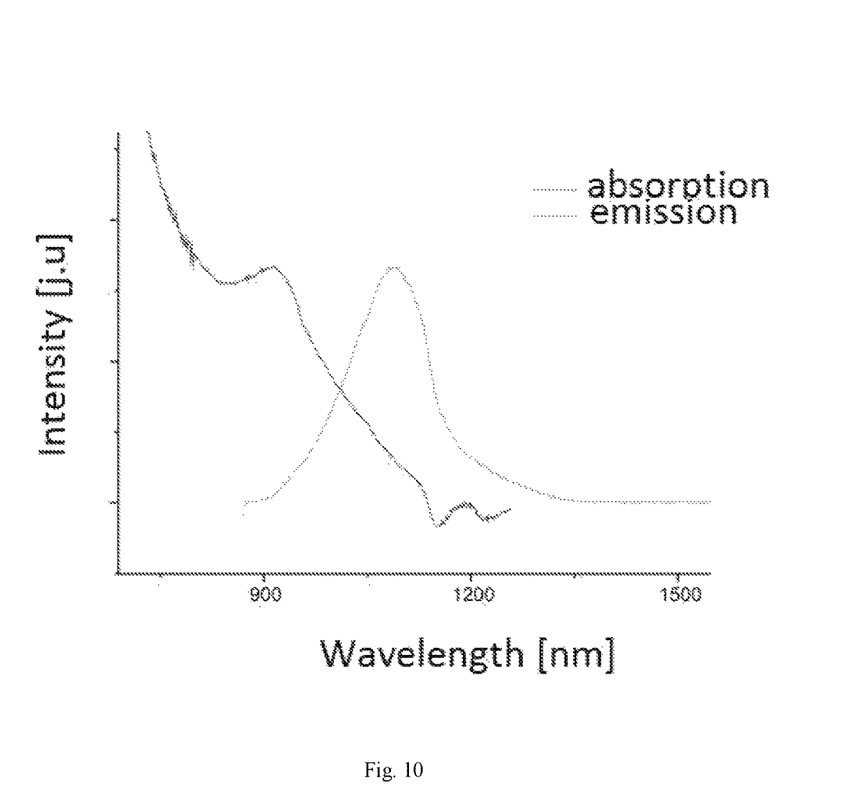
FIG. 10 shows a graph illustration of the emission and absorption spectra of solutions of the PbS/CdS/DTC-Lys quantum dots recorded in aqueous solution.
Figure 11:
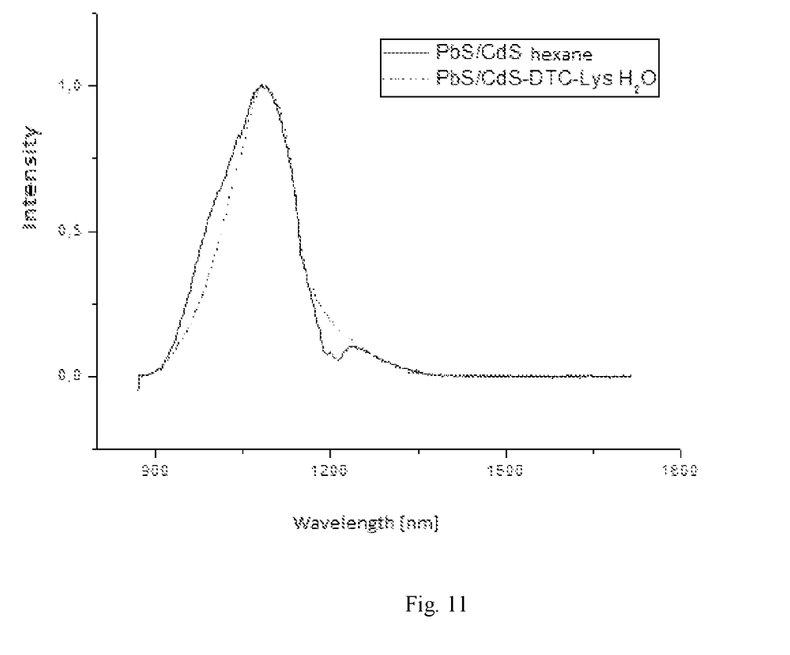
FIG. 11 shows a graph illustration of an emission spectrum before (hexane) and after ($H_2O$) procedure of the exchange of ligand on the surface of PbS/CdS dots using lysine dithiocarbamate.

FIG. 10 shows the emission and absorption spectra of the PbS/CdS-DTC-Lys quantum dots in an aqueous solution. Positions of the maxima of emission (FIG. 11) and absorption after the exchange of the ligand to DTC-Lys remain unchanged in relation to the starting sample (PbS/CdS).

We claim:

1. A method for preparing water-dispersible core-shell quantum dots stabilized with a layer of hydrophilic surface ligands, the method comprising the steps of:
   making a core of PbS nanocrystals; and
   reacting amino acids with carbon disulphide so as to obtain a shell of CdS layer and surface ligands comprised of dithiocarbamates and so as to maintain photoluminescence,
   wherein the step of reacting amino acids comprises the steps of:
   adding a solution of PbS/CdS in chloroform to an emulsion of an aqueous solution of amino acid and carbon disulphide so as to form a mixture;
   stirring said mixture vigorously for at least 20 hours so as to form a stirred mixture;
   separating said stirred mixture into phases, wherein at least one phase is comprised of an upper aqueous phase, said upper aqueous phase being comprised of a solution of PbS/CdS/DTC-amino acid residue; and
   purifying said solution of PbS/CdS/DTC-amino acid residue.

2. The method for preparing water-dispersible core-shell quantum dots, according to claim 1, wherein said amino acids are comprised of at least one of lysine, valine, proline, glycine, arginine, alanine, and beta-alanine.

3. The method for preparing water-dispersible core-shell quantum dots, according to claim 1, wherein the step of reacting amino acids further comprises the step of:
   mixing stoichiometric amounts of amino acids in carbon disulphide, wherein maximum concentration of amino acids is limited by solubility in water.

4. The method for preparing water-dispersible core-shell quantum dots, according to claim 1, wherein at least one phase is comprised of an emulsion phase, said emulsion phase being comprised of dithiocarbamate.

5. The method for preparing water-dispersible core-shell quantum dots, according to claim 1, wherein said solution of PbS/CdS in chloroform has a concentration ranging from 0 to 100 mg/cm3.

6. The method for preparing water-dispersible core-shell quantum dots, according to claim 1, wherein a volume ratio of said solution of PbS/CdS in chloroform to said emulsion has a range of from 1:10 to 10:1.

7. The method for preparing water-dispersible core-shell quantum dots, according to claim 1, wherein the step of purifying said solution of PbS/CdS/DTC-amino acid residue comprises the steps of:
   centrifuging said solution of PbS/CdS/DTC-amino acid residue;
   adding acetone so as to form a clouded solution with a first cloudiness;
   centrifuging said clouded solution so as to form a centrifuged precipitate;
   dissolving said centrifuged precipitate in a minimum amount of water so as to form a dissolved precipitate solution; and
   adding acetone to said dissolved precipitate solution so as to form a dispersed colloid solution.

8. The method for preparing water-dispersible core-shell quantum dots, according to claim 7, further comprising the steps of:
   washing said centrifuged precipitate with acetone, after the step of re-centrifuging said clouded solution, so as to form a washed precipitate,
   wherein the step of dissolving said centrifuged precipitate is comprised of dispersing said washed precipitate as said centrifuged precipitate in distilled water so as to obtain said dissolved precipitate solution.

9. The method for preparing water-dispersible core-shell quantum dots, according to claim 1, wherein said solution of PbS/CdS/DTC-amino acid residue is comprised of particles sized from 4 to 20 nm.

10. A The method for preparing water-dispersible core-shell quantum dots, according to claim 1, wherein the step of purifying said solution of PbS/CdS/DTC-amino acid residue is comprised of the steps of:
   adding an excess of a solution of a quaternary ammonium salt to said solution of the PbS/CdS-DTC-amino acid residue so as to form a mixed solution;
   stirring said mixed solution at room temperature for 24 hours so as to form a stirred solution;
   centrifuging said stirred solution so as to separate quantum dots from said PbS/CdS-DTC-amino acid residue;
   washing said quantum dots with distilled water; and
   dispersing said quantum dots in a phosphate buffer at pH 7.4 so as to obtain a colloidal solution of quantum dots in a PBS buffer.

11. The method for preparing water-dispersible core-shell quantum dots, according to claim 10, wherein said quaternary ammonium salt is comprised of diallyl-dimethyl-ammonium polyhydroxide.

* * * * *